Figure 1:
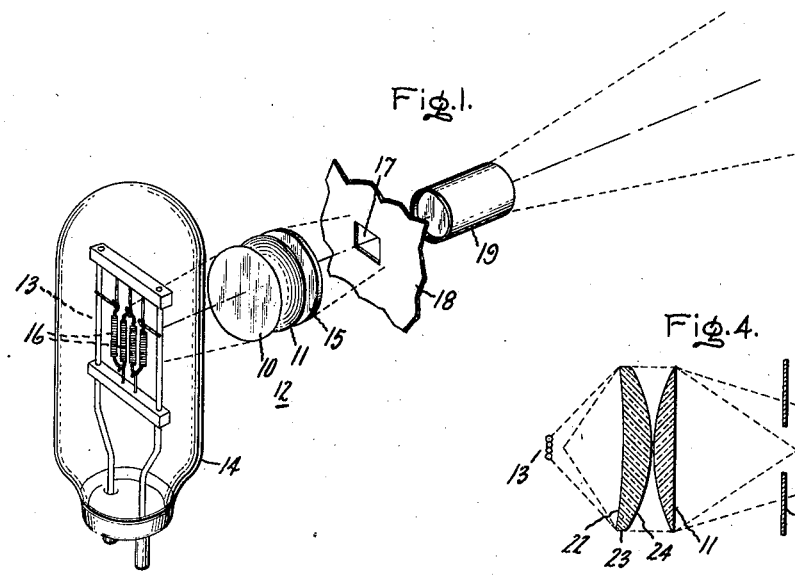

Nov. 14, 1939.  F. E. CARLSON  2,180,031
OPTICAL PROJECTION APPARATUS
Filed June 25, 1938

Inventor:
Frank E. Carlson,
by Harry E. Dunham
His Attorney.

Patented Nov. 14, 1939

2,180,031

UNITED STATES PATENT OFFICE 2,180,031

OPTICAL PROJECTION APPARATUS

Frank E. Carlson, Cleveland, Ohio, assignor to General Electric Company, a corporation of New York Application June 25, 1938, Serial No. 215,831

1 Claim. (Cl. 88—24)

.nvention relates to the optical systems of ı and still projection apparatus and more paıticularly to the condensing lenses in such apparatus when used in combination with a non-uniform light source, such as is, for example, characteristic of an electric incandescent lamp.

In such apparatus the condensing lenses serve to direct light from the source through the picture aperture to the projection lens. To do this effectively, the condensing lenses should be of a focal length such that an image of the source is formed between the picture aperture and the projection lens. The position of the source image for maximum light utilization depends upon the angle of acceptance and the relative aperture and focal length of the projection lens and the spacing between condensing lenses and picture aperture.

If the source be non-uniform in brightness, the image formed by the condensing lens will also be non-uniform. It is the degree of uniformity across the beam at the picture aperture that determines whether the screen is acceptably illuminated; and this uniformity increases as the position of the image is moved forward from the aperture. In practice, the image of the non-uniform source has, accordingly, been placed a considerable distance from the position for maximum light utilization, so that the net light output of the system is much less than the maximum feasible with a source of uniform brightness.

The usual condensing lens system has lenses with surfaces of revolution about the axis of projection and therefore the image formed by these lenses is the same distance from the lenses in all planes through the axis of projection. If the degree of uniformity of the source were the same in all such planes, the prevailing practice previously described would be desirable. However, if the degree of uniformity of the source is not the same in all such planes, then the prevailing practice is neither desirable nor necessary. This is the case for a source such as the electric incandescent lamps for projection purposes. Such a source has a filament formed of a plurality of coiled sections arranged parallel with each other and there is relatively little lack of uniformity in said coils. The coiled sections extend completely across the light source and the non-uniformities therein are largely due to the spaces between the coiled sections.

One object of my invention is to provide a condensing lens system designed to focus each dimension of such a source in separate planes, each of which is the nearest plane for which uniform illumination results at the picture aperture. Other features and advantages of my invention will be apparent from the description which follows of species thereof and from the accompanying drawing.

Figure 4:
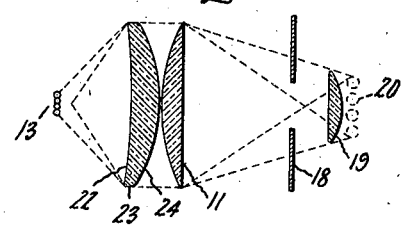
Figure 2:
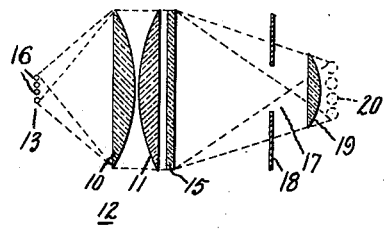
Figure 5:
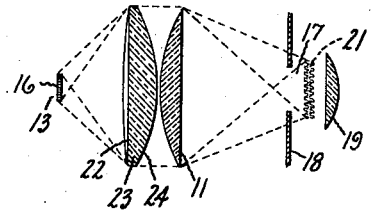
Figure 3:
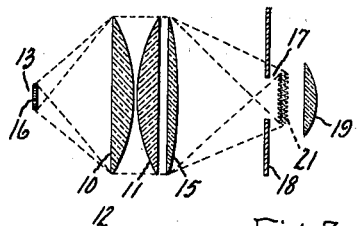
Figure 6:
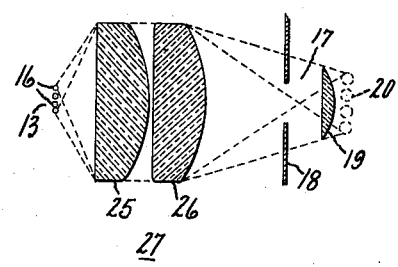
Figure 7:
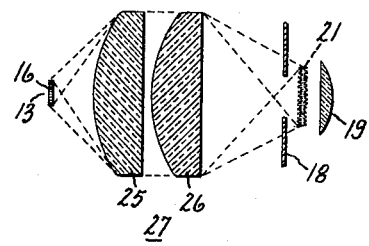

In the drawing, Fig. 1 is a perspective view of the electric incandescent lamp and the lenses of the optical system of one form of my invention; Figs. 2 and 3 are diagrammatic views corresponding to horizontal and vertical sections respectively through the light source and lenses of the optical system shown in Fig. 1; Figs. 4 and 5 are similar diagrammatic views of a second form of the optical system of my invention; and Figs. 6 and 7 are similar diagrammatic views of still another method of accomplishing the same results.

The optical system of the particular form of my invention shown in Figs. 1, 2 and 3 comprises the plano-convex lenses 10 and 11, generally referred to collectively as the condensing lens 12, which form a beam of light from that emitted by the incandescent filament 13 of the electric lamp 14. Both the lenses 10 and 11 of the condensing lens 12 have surfaces of revolution about the axis of projection but can have another form, for instance, in which the lenses together direct a light beam along said axis substantially equally distributed thereabout. From the condensing lens 12, the light passes to the cylindrical lens 15 which is preferably mounted in optical contact with the surface of lens 11 or relatively near thereto and which is arranged with the axis of its cylindrical surface perpendicular to the coiled sections 16 of the filament 13. The lens 15 is the only change in an otherwise typical system required by my invention and the light beam projected passes through the aperture 17 in the opaque aperture plate or screen 18 which normally locates the picture film or slide. The projection lens system is herein represented by the lens 19.

In the optical system shown, the condensing lens 12, the filament 13, and the aperture plate 18 are located in the same relation to each other as in a conventional system and the introduction of the cylindrical lens 15 does not change the image position 20 (Fig. 2) in a plane transverse to the coiled filament sections 16 since this image position in this plane is dictated by the brightness non-uniformity of the source due to the spaces between these coiled sections. However, in the plane parallel to the coiled filament sections (Fig. 3) the introduction of the cylindrical lens 15 does change the image position 21 to a plane nearer the aperture plate 18. This nearer image position 21 is desirable because it is the best position for the source image for maximum light utilization. At this best position in the plane parallel to the coiled sections the screen illumination is acceptably uniform because there is relatively little brightness non-uniformity in the coiled sections 16 of the filament 13.

The filament 13 shown is the monoplane type but could as well be the equally popular biplane type, both of which are formed by parallel arranged coiled sections 16 in a single plane or in two planes offset from each other. In both cases, the variations in brightness thereof are caused principally by the spaces between the coiled sections which are always within the field of the lens 10 and to a much less degree by the spaces between the separate turns of each coiled section. The spaces between the coiled sections extend from one edge of the filament 13 to the opposite edge and therefore the uniformity across the beam at the picture aperture is, in the type of optical system described, achieved by moving the image position forward from the aperture a considerable distance from the best position for light utilization. Because the loss of light from the light beam is proportionate to the distance which the source image must be moved from the best position for light utilization, this particular arrangement of the variations in brightness of the filament makes it desirable to use a condensing lens system having different focal lengths in the directions or planes of said variations.

For instance, I have found that the introduction of lens 15 increases the amount of light passing through the aperture 17 and lens 19 by from ten to seventeen per cent. In this particular system, the filament images are formed approximately 45 mm. beyond the picture aperture 17 in a plane parallel to said axes. The lens 15 in the system has a cylindrical section of six diopters and is located approximately 45 mm. from the picture aperture 17.

The modification of my apparatus in Figs. 4 and 5 differs from the former apparatus in that the variable focusing effect of the condensing lens system is provided by the cylindrical concave surface 22 of the lens 23. The lens 23 takes the place of one of the lenses of the condenser system and provides the usual convex surface 24 adjoining the convex surface of the lens 11. The lenses 23 and 11 cooperate to produce the image 20 of the source at the usual position as shown in Fig. 4 in a plane transverse to the filament sections 16 and the image 21 shown in Fig. 5 in a plane parallel to the filament sections 16. This modification of my invention illustrates but one way of introducing the necessary light directing means into the condensing lens and I am aware that said means can be incorporated in either the plane or convex portions of either or both of the lenses making up the condensing lens.

The modification of my invention shown in Figs. 6 and 7 illustrates another manner of producing the variable focusing effect desired. In this instance, both lenses 25 and 26 making up the condensing lens 27 are of double cylindrical convex form with axes of the cylindrical curvature of the opposite sides at 90 degrees to each other. The refractive powers of the lenses 25 and 26 in a plane transverse to the filament sections 16 is less than that in a plane parallel to said sections 16 so that the images 20 and 21 of the filament 13 are formed at the position shown in Figs. 6 and 7 in these planes. Obviously, the desired lens combination can also be provided by other lenses together having the desired refractive power in the different planes.

What I claim as new and desire to secure by Letters Patent of the United States is:

Apparatus of the class described comprising an electric incandescent lamp having a filament formed of a plurality of spaced sections of coiled wire arranged parallel to each other, a screen located adjacent thereto having an aperture therein adapted to frame the picture film or slide to be projected, a condensing lens located between the filament and the screen adapted to direct a portion of the light emitted by said filament through the aperture in said screen comprising a pair of double cylindrical convex lenses having the axes of the opposite sides of each at right angles to each other and having a greater refractive power in a plane parallel to the filament sections so that the focal length of the light beam in a plane transverse to said sections is greater than in a plane parallel thereto and a greater portion of said light beam is directed through the aperture in said screen.

FRANK E. CARLSON.